United States Patent
Ishii (10) Patent No.: US 7,082,198 B1
(45) Date of Patent: Jul. 25, 2006

(54) DATA RECEIVING METHOD AND DATA RECEIVING UNIT THEREFOR

(75) Inventor: Makoto Ishii, Kanagawa (JP)

(73) Assignees: Sony Corporation (JP); Keio University (JP)

( * ) Notice: Subject to any disclaimer, the term of this patent is extended or adjusted under 35 U.S.C. 154(b) by 709 days.

(21) Appl. No.: 09/697,110

(22) Filed: Oct. 26, 2000

(30) Foreign Application Priority Data

Oct. 28, 1999 (JP) ............................... P11-307637

(51) Int. Cl.
*H04L 9/00* (2006.01)
*H04L 9/32* (2006.01)
*H04H 1/00* (2006.01)

(52) U.S. Cl. .................. 380/239; 380/235; 380/240; 380/241; 713/162; 713/187; 725/1; 725/25; 725/32; 705/51

(58) Field of Classification Search ............... 380/239, 380/240, 241, 235; 705/51; 713/162, 187; 725/1, 25, 32

See application file for complete search history.

(56) References Cited

U.S. PATENT DOCUMENTS

| | | | | |
|---|---|---|---|---|
| 5,574,785 A | | 11/1996 | Ueno et al. ..................... 380/2 |
| 5,781,135 A | * | 7/1998 | Kim et al. ..................... 341/67 |
| 5,787,171 A | * | 7/1998 | Kubota et al. ............... 380/239 |
| 5,848,162 A | * | 12/1998 | Tsumura ....................... 705/52 |
| 5,919,257 A | * | 7/1999 | Trostle ......................... 713/200 |
| 5,959,978 A | * | 9/1999 | Horikoshi et al. .......... 370/264 |
| 6,493,824 B1 | * | 12/2002 | Novoa et al. ................ 713/162 |
| 6,850,910 B1 | * | 2/2005 | Yu et al. ....................... 705/51 |

FOREIGN PATENT DOCUMENTS

| | | | |
|---|---|---|---|
| EP | 0 877 499 A2 | * | 11/1998 |
| EP | 0877499 | | 11/1998 |
| JP | 03211980 A | * | 9/1991 |
| WO | 9720413 | | 6/1997 |
| WO | 9726730 | | 7/1997 |
| WO | WO 97/26730 | * | 7/1997 |

* cited by examiner

*Primary Examiner*—Taghi T. Arani
(74) *Attorney, Agent, or Firm*—Lerner, David, Littenberg, Krumholz & Mentlik, LLP (57) ABSTRACT

A data receiving method and unit extracts required data from among received digital signal data, and uses a predetermined decoding key to decode the extracted data. In the method and unit, it is determined whether the decoded data is normal. If it is determined that decoding has not been normally performed, corresponding data is deleted.

18 Claims, 4 Drawing Sheets

DATA RECEIVING METHOD AND DATA RECEIVING UNIT THEREFOR

BACKGROUND OF THE INVENTION

1. Field of the Invention

The present invention relates to satellite data distribution systems and to communication service systems, and in particular, relates to a data receiving method and unit suitable for receiving computer data which are electronically distributed to individuals.

2. Description of the Related Art

The moving picture experts group phase 2 (MPEG-2) standard is an encoding method applied to current broadcasting, high definition television, audio visual apparatuses, etc. By implementing broadcast service using digital broadcast signals encoded using the MPEG-2 standard, the number of channels can be increased over that in conventional analog broadcasting, and the cost of each channel can be reduced. This enables services such as broadcasts of not only pictures and sound, but also of various types of data.

In mutichannel digital broadcasting, various data broadcasts utilize a satellite's high transfer speed (e.g., a maximum of 30 Mbps in the case of a 27-MHz transponder). The data broadcasts include, for example, a music service, a game service, a magazine information service, and an Internet (WWW) service.

When a data distribution service is broadcast by a communications satellite, it is necessary to provide a system in which only subscribers can receive the service. For example, for many uses such as when a data provider desires to transmit data only to subscribers, or each user at a receiving side desires to receive its unique secret information from the provider, a personal secrecy protection method is required.

When a high speed data transfer at a maximum of 30 Mbps from a communications satellite is considered, it is found that the receiving side must decode encoded data in real time and at a high speed.

Also, in the case in which a satellite broadcast receiver or a communication service receiver uses a receiver terminal to simultaneously receive a plurality of different secret data (a plurality of programs) which can be received only by the one receiver, a device is required which decodes the received data while retrieving and switching decoding keys which sequentially change in real time.

When a receiver terminal for use in the above data broadcast service is considered, it is important to use a single piece of hardware to efficiently perform functions required for receiving satellite data, functions for decoding received encoded data in real time, functions for switching functions required for decoding, etc. In this type of service which performs, at a high speed, functions of switching decoding keys required for decoding, it is possible that an incorrect decoding key may be set in a decoder of the terminal, depending on the method used for setting the decoding key. The setting of an incorrect decoding key causes incorrect decoding, making it impossible to reproduce the original data. Inspection of the received data or transfer of error data to a computer is not possible in the computer itself (because the computer may crash in the worst case). Accordingly, in order for the receiver terminal to have a way of decoding data in real time, it is preferable that the receiver terminal have a self-diagnosis function to determine whether decoding has been correctly performed. However, no data receiving system has such a function.

SUMMARY OF THE INVENTION

Accordingly, it is an object of the present invention to provide a data receiving method and unit therefor by which, in a multichannel and high-data volume satellite data broadcasting service, a satellite Internet service, etc., when a receiver simultaneously receives a plurality of different high-volume encoded data capable of being received only by one subscriber, and in any situation (even when the setting of an incorrect decoding key occurs in a service system), only correctly decoded data is transferred to the computer.

To this end, according to an aspect of the present invention, the foregoing object is achieved through provision of a data receiving method including the steps of extracting required data from among received digital signal data, decoding the extracted data by using a predetermined decoding key, determining whether the decoded data is normal, and deleting the decoded data when having determined that the decoded data is not normal.

According to another aspect of the present invention, the foregoing object is achieved through provision of a data receiving unit including a receiver, a converter for converting signals received by the receiver into digital signal data, a data extractor for extracting required data from among the digital signal data obtained by the converter, a decoding-key-setting unit for setting a decoding key required for decoding the extracted data, a decoder for decoding the extracted data by using the decoding key set by the decoding-key-setting unit, an examination unit for examining the data decoded by the decoder, and a deletion unit for deleting data which is treated by the examination unit as have not been normally decoded.

According to the present invention, a plurality of highly-confidential satellite-received data that only a user desires or that are directed by a sender to a particular user can be simultaneously received. Since a data receiving unit of the present invention has a mechanism that deletes erroneous data based on the result of examining whether decoding has been normally performed, incorrectly decoded data cannot be transferred to a computer connected to the data receiving unit. This prevents the computer from malfunctioning based on the erroneous data. Therefore, the present invention is effective in reducing the load on the computer or malfunctions in the computer.

DESCRIPTION OF THE PREFERRED EMBODIMENTS

The present invention is described below with reference to the accompanying drawings.

First, with reference to FIG. 1, a system configuration of a satellite data-broadcasting/communication service is described below in which a data receiving unit according to an embodiment of the present invention is used.

Figure 1:
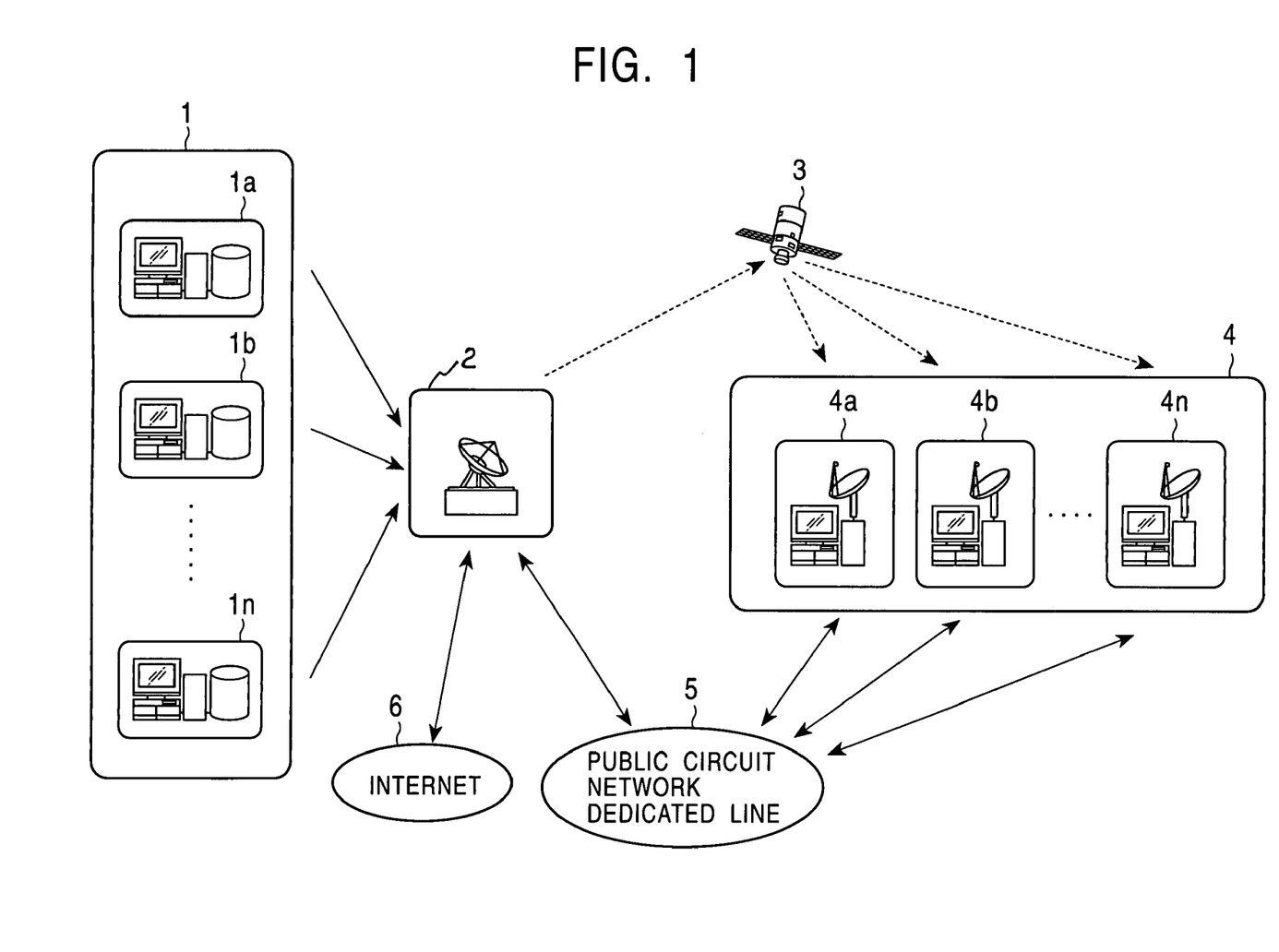
FIG. 1 is an illustration of a satellite data-broadcasting/communication service to which an embodiment of the present invention is applied.

As shown in FIG. 1, the satellite data-broadcasting/communication service includes a plurality of information providers 1a to in and a service operating company 2 that transmits information sent from the information providers 1a to 1n as broadcast data to a communications satellite 3. The data relayed by the communications satellite 3 are received by data receiving units for subscribers 4a to 4n. The data receiving units for the subscribers 4a to 4n are connected to the service operating company 2 by wired transmission channels 5 such as a public circuit network or dedicated lines, and information can be sent from each subscriber. The service operating company 2 is connected to the Internet 6, and various Internet information can be transmitted via the communications satellite 3.

Each subscriber has a contract with the service operating company 2 in order to obtain computer-readable and computer-operable information which is collectively sent by the service operating company 2, such as newspaper information, music information, shopping information, and Internet WWW information. The service operating company 2 collects various pieces of information prepared and transmitted by the information providers 1a to in, and transmits the collected pieces of information to the communications satellite 3. Here, it is supposed that when the service operating company 2 transmits data, a free data format of the service operating company 2 may not be used as the format of data in a satellite communication channel, and the data format of the service operating company 2 is instead converted into a format based on a standard such as the DVB standard which is a data format similar to that in satellite broadcasts currently in operation in Europe and Japan.

By using a receiving antenna and a data receiving unit which are provided by the service operating company 2, each of the subscribers 4a to 4n can receive data distributed from the service operating company 2 via the communications satellite 3.

The data receiving unit used here is intended to receive not only video and audio services distributed in current broadcast satellite (BS) broadcasts and communications satellite (CS) broadcasts, but also computer-processible information. Specifically, the data receiving unit is a widely used board-type unit built into a computer or a box-type unit (set-top box) that can transfer data to a computer.

Accordingly, each subscriber can receive data by directly connecting a coaxial cable from the receiving antenna to the built-in data receiving unit (board), or by connecting the coaxial cable to the box-type data receiving unit. The satellite data-broadcasting/communication service shown in FIG. 1 includes not only the distribution of unidirectionally broadcast video and audio services (such as the current BS or CS broadcasts) to each subscriber but also the interactive distribution of information in response to a request from a subscriber at a particular time, such as the browsing of WWW information on the Internet. Thus, in a communications satellite channel at a particular time, not only information to be simultaneously viewed by all the subscribers 4a to 4n, but also information for only one individual subscriber, may be transmitted.

To deal with this situation, a method is required in which, although the original information-bearing signals from the communications satellite 3 can be received by all the subscribers 4a to 4n, a particular subscriber is allowed to view only information contracted by the individual (or by a group). For example, in this method, the original information-bearing signals that the subscriber 4a requested the service operating company 2 to distribute via the wired transmission channel 5 can be received by the other subscribers 4b to 4n. However, only the subscriber 4a can obtain meaningful information, and the other subscribers 4b to 4n cannot ever obtain the distributed information as meaningful information. A data receiving unit of the present invention uses this method.

When each subscriber decides at a particular time that information is necessary for the purpose of individual, such as the browsing of WWW information, a computer having the above-described data receiving unit uses a modem or an Ethernet interface to transmit an information request command to the service operating company 2 via the wire communication channel 5 such as a public circuit network or a dedicated line. When receiving the information request command from a particular subscriber, the service operating company 2 obtains the requested information by accessing the Internet 6 or the information providers 1. The service operating company 2 converts (i.e., encrypts) the obtained information into data in a form that can be received only by one particular subscriber, and transmits the data to the communications satellite 3.

The particular subscriber's unit decodes the encrypted data (data encrypted so as not to be received by the other subscribers' units) which was transmitted from the transmitting side by using the subscriber's own decoding key, whereby that particular subscriber can obtain data to be used only by that subscriber.

The foregoing description is an outline of the satellite data-broadcasting/communication service system in which the data receiving unit of the present invention is used.

Figure 2:
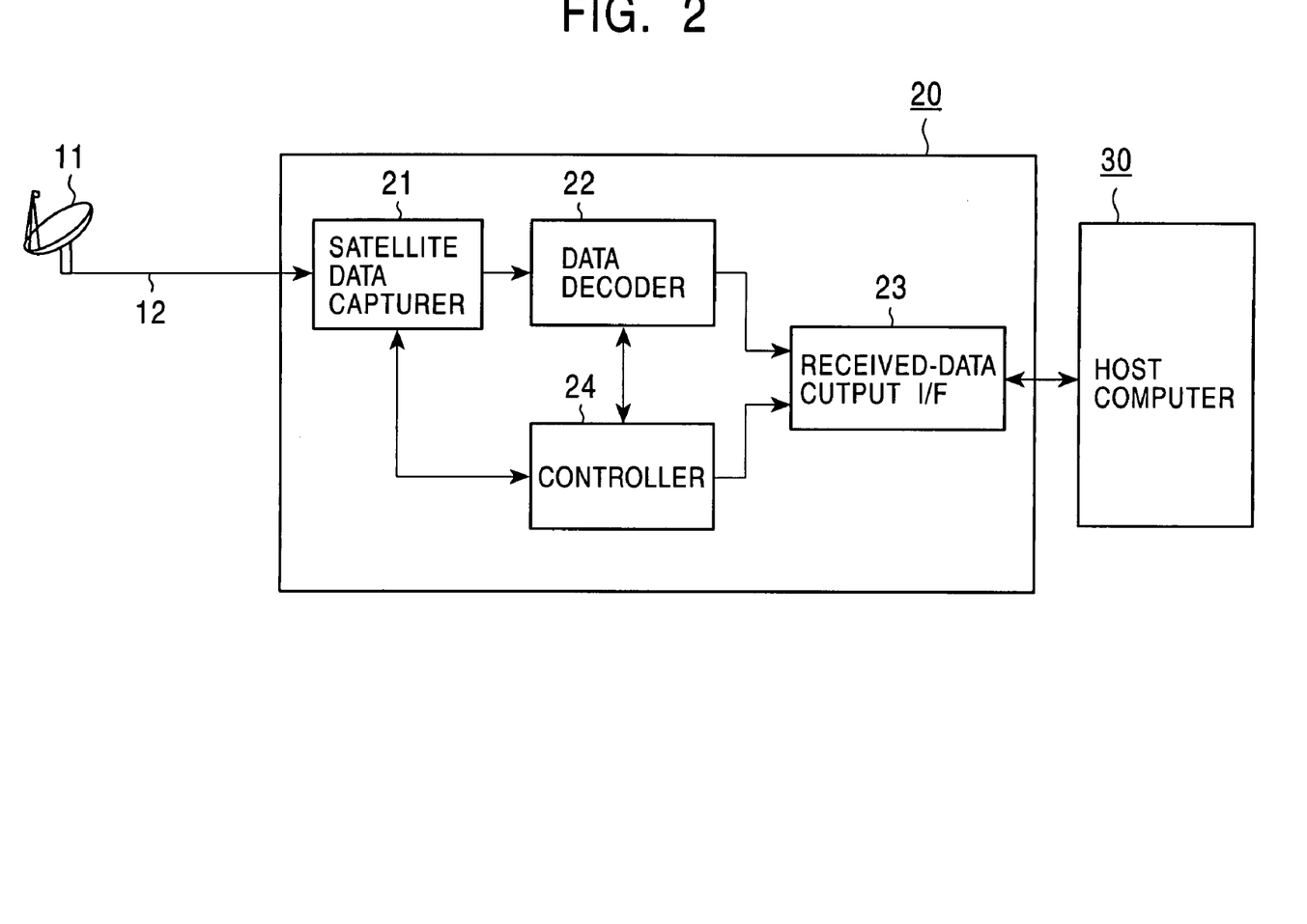
FIG. 2 is a block diagram showing a data receiving unit according to an embodiment of the present invention.
Figure 3:
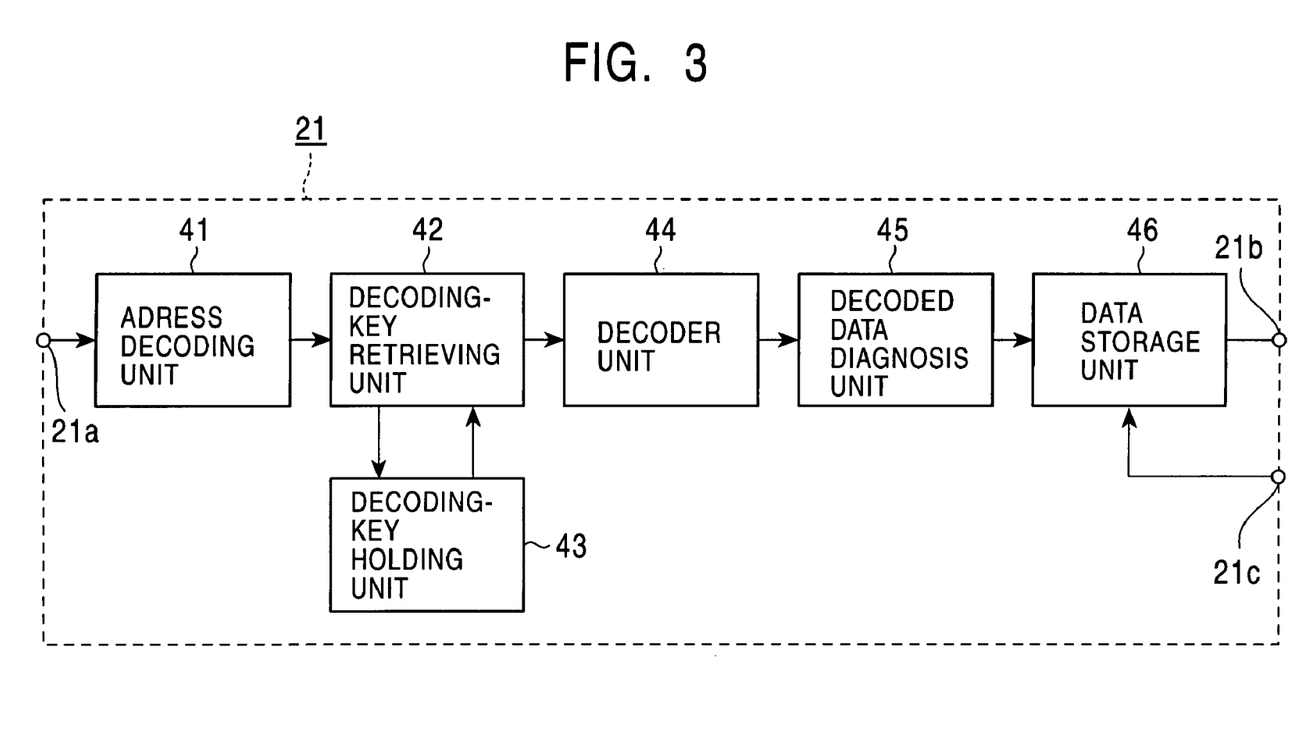
FIG. 3 is a block diagram showing a data decoder in the data receiving unit shown in FIG. 2.

The structure of the data receiving unit used in the above-described system is described below with reference to FIGS. 2 and 3.

First, the overall structure of a data receiving unit 20 that receives data in a satellite communication channel is described with reference to FIG. 2.

All the data in the satellite communication channel are received by a receiving antenna 11. Signals from the receiving antenna 11 are supplied to the data receiving unit 20 via a coaxial cable 12. The data receiving unit 20 includes an input terminal for the coaxial cable 12, and a received IF signal is input from the input terminal.

The input received IF signal includes all types of information (e.g., control information for the data receiving unit, and information addressed to another subscriber) in addition to particular information desired by a subscriber. A satellite data capturer 21 performs processes on the received IF signal, such as analog-to-digital conversion of a received signal on a particular received channel into digital data, data synchronization, and formation of packets.

The received information digitized by the satellite data capturer 21 are decoded by a data decoder 22. The data decoder 22 compares a media access control (MAC) address (destination address) in the MAC header of each received packet with a MAC address (i.e., an address set in the data receiving unit 20) designated by a controller 24 in the data receiving unit 20. When both MAC addresses match and the received packet is encrypted, the data decoder 22 performs decoding processing. When an address value exists which is equal to a MAC address included in a packet in the controller 24, the address value means that "a decoding key for the decoding process exists". By using the decoding key, which is paired with the MAC address beforehand, the received packet is decoded.

Figure 4:
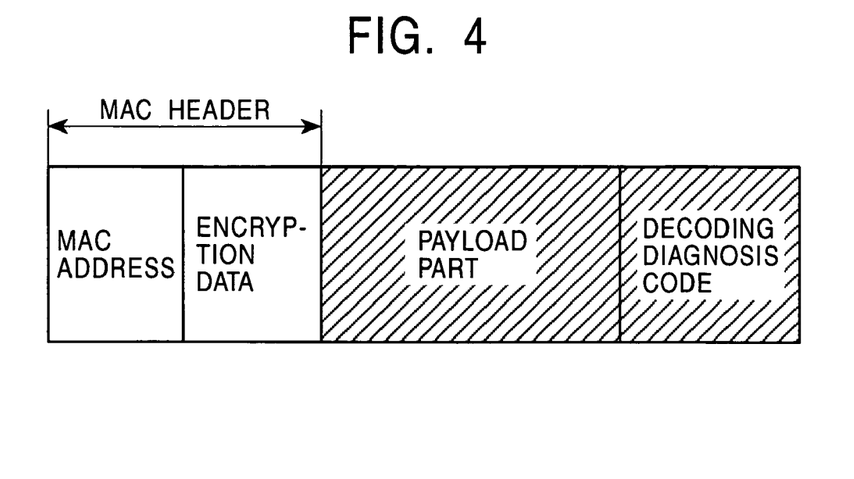
FIG. 4 is an illustration of a format of a packet in a transmission channel for a satellite data-broadcasting/communication service according to the present invention.

The received packet includes encryption data indicating whether the packet is encrypted, in addition to the MAC address (destination address) in the MAC header, as shown in FIG. 4. Only when the encryption data is valid will the decoding process be performed. When the encryption data is invalid, the received packet is directly transferred to a received-data output interface (I/F) 23 without being decoded.

When a MAC address in a received packet input from the satellite data capturer 21 to the data decoder 22 does not coincide with the MAC address designated by the controller 24, and when encryption data in the MAC header of the packet is valid (i.e., the packet is encrypted), this means that "no decoding key exists although the packet must be decoded since it is encrypted". In this case, the stream including the packet is deleted.

Only in a case in which a decoding key normally exists does the data decoder 22 examine whether it has normally decoded the received packet, and if it is determined that normal decoding has been performed, the decoded packet is transferred to the received-data output I/F 23 at a subsequent stage. If the data decoder 22 has determined that "decoding has not been normally performed although a packet has been decoded", the packet is deleted without being transferred to the received-data output I/F 23.

Here, a process for "examining whether the data decoder 22 has normally decoded the received packet", which is performed by the data decoder 22, is described below.

In brief, each packet transmitted from the communications satellite 3 has the format shown in FIG. 4. After the MAC header including the MAC address and the encryption data, there is a payload part containing the actual transmitted data (i.e., the data for a computer). The payload part and subsequent parts are encrypted; and the MAC header is not encrypted. After the encrypted payload part, a decoding diagnosis code is set beforehand. Although the decoding diagnosis code may have any content, a constant determined by the transmitting and receiving systems is used as the code.

The decoding diagnosis code is encrypted using an encryption key identical to that for the payload part. When the data decoder 22 uses a correct decoding key to perform the decoding process, the value of the decoding diagnosis code, which is obtained after the decoding process, must be a predetermined fixed value determined by the transmitting and receiving systems. If the data decoder 22 uses an incorrect decoding key for the decoding process, the decoding diagnosis code is not the expected value, and the value indicates that the decoding process, including that for the payload part, has failed. The foregoing description is about a basic method of decoding verification.

The received-data output I/F 23 transfers each normally decoded data packet to a host computer 30 connected to the data receiving unit 20 via a local area network (LAN) or the like. In this transfer, it is supposed that the received-data output I/F 23 has a logic process for protecting a communication protocol with the LAN-connected host computer 30.

The controller 24 performs overall monitoring and management of the data receiving unit 20. Specifically, for overall monitoring and management of the data receiving unit 20, the controller 24 interprets control commands from an application executed in the host computer 30 connected to the data receiving unit 20 and data for controlling the data receiving unit 20, which are received from the communications satellite 3. The controller 24 receives the control commands (from the application in the host computer 30) from the received-data output I/F 23 via a communication channel such as a LAN.

The decoding key used for decoding each data packet by the data decoder 22 may sequentially change. Whenever the decoding key changes, a decoding key is transferred by the controller 24. Also, the host computer 30 may set a sequentially changing decoding key in the controller 24. If the controller 24 fails to correctly set the sequentially changing decoding key, a decoding key for use in decoding by the data decoder 22 becomes incorrect.

The following describes an example of a case in which the decoding key set in the data decoder 22 is erroneous.

Normally, as a MAC address specifying the data receiving unit 20, the same address may be used for a long time in a service. Even if a subscriber uses the same MAC address for a long time, an occasional change of a decoding key (i.e., for data packets having the same MAC address, a decoding key for use in decoding is changed over time) can thwart hackers. At the moment a decoding key used in a MAC address is switched to a new decoding key (while the MAC address remains the same), there is a high probability that the data decoder 22 may use an incorrect decoding key.

In a case in which, although the transmitting system transmits data encrypted with a new encryption key for a MAC address, an old decoding key for a MAC address remains in the data decoder 22 or the controller 24 in the data receiving unit 20 (just prior to switching to a new decoding key), decoding with an incorrect decoding key is performed, and data cannot be correctly reproduced. In this type of case, it is very likely that an incorrect decoding key is used to perform decoding. Needless to say, examples of using an incorrect decoding key may be considered, but descriptions thereof are omitted here.

In addition, when a meaningless packet decoded with an incorrect decoding key or an incorrectly decoded meaningless packet is transferred to the host computer 30, the packet must be deleted from the host computer 30.

The deletion of the incorrectly decoded packet is very important in reducing the load on the host computer 30 and the risk of crashing the host computer 30, which may occur in the worst case when a meaningless packet is treated as being normal and is transferred to the host computer 30.

Next, the structure of the data decoder 22 and a process thereby are described below with reference to FIG. 3.

The received data are supplied to a terminal 21 of the satellite data capturer 21, and the address data in the MAC address is decoded by an address decoding unit 41. When the decoded address coincides with an address set to the data receiving unit 20, a packet containing the data is supplied to a decoding-key retrieving unit 42. A packet of data in which a decoded address does not coincide is treated data which is not addressed to the data receiving unit 20, and the packet is deleted so as not be supplied to the subsequent processing stage.

The decoding-key retrieving unit 42 requests a decoding-key holding unit 43 to transfer a key for use in decoding from among decoding keys held in the decoding-key holding unit 43. The decoding-key retrieving unit 42 supplies the decoding key obtained by the request to a decoder unit 44, with the received packet.

The decoder unit 44 uses the decoding key to decode the data of the supplied packet, thereby decoding the encrypted data. The data decoded by the decoder unit 44 is supplied to a decoded data diagnosis unit 45. The decoded data diagnosis unit 45 determines the value of the decoding diagnosis code (see FIG. 4) added to each packet, and determines whether the value is a predetermined constant. When a received data packet whose decoding diagnosis code is not the predetermined constant, the entire packet is deleted. The decoded data diagnosis unit 45 supplies a data storage unit 46 with only the decoded data of the payload part in each packet whose decoding diagnosis code is the predetermined constant. The data storage unit 46 may be formed by a relatively small storage memory for temporarily storing data or by a mass-storage unit such as a hard disk drive. In response to a transfer request supplied from the received-data output I/F 23 via a terminal 21c, the data stored in the data storage unit 46 are sequentially transferred from a terminal 21b to the received-data output I/F 23, whereby the received data are transferred to the host computer 30 connected to the received-data output I/F 23.

The units constituting the data decoder 22 are described below.

The decoding-key retrieving unit 42 compares a MAC address in the MAC header of a packet received from the satellite data capturer 21 with a MAC address preset in the controller 24. When both MAC addresses coincide with each other, the decoding-key retrieving unit 42 reads a decoding key corresponding to the MAC address from the decoding-key holding unit 43 (since the decoding-key holding unit 43 must hold the MAC address and the decoding key in the form of a pair).

The decoding key read from the decoding-key holding unit 43 is transferred to the subsequent decoder unit 44, with the entire packet being received. At the same time, the decoding-key retrieving unit 42 outputs also a "decoding command".

If an address which coincides with the MAC address in the MAC header of the packet received from the satellite data capturer 21 is not set by the controller 24, this case indicates that "a key to be decoded does not exist", and the entire packet is deleted in the decoding-key retrieving unit 42 (i.e., the packet is not transferred to the subsequent decoder unit 44).

This process is performed only when encryption data in the MAC header of the packet received from the satellite data capturer 21 indicates that encryption has been performed. If the encryption data indicates that "encryption has not been performed", the packet is transferred to the subsequent decoder unit 44 without the comparison between MAC addresses. At this time, the decoding-key retrieving unit 42 requests the decoder unit 44 to allow the packet to pass through it without sending the "decoding command".

The number of decoding keys that can be decoded at a time is not limited to one. In other words, the controller 24 may set, in the decoding-key retrieving unit 42, a plurality of MAC addresses in packets to be decoded.

The decoding-key holding unit 43 holds pairs of MAC addresses and decoding keys which become valid at a time. Each pair of a MAC address and a decoding key which are valid at a time is set by the controller 24, as required. The value of the MAC address existing in the decoding-key holding unit 43 is identical to the value of a MAC address set in the decoding-key retrieving unit 42. The controller 24 must set the same value at the same time in both the decoding-key retrieving unit 42 and the decoding-key holding unit 43.

Accordingly, when a case occurs in which all packets are not encrypted depending on the type of service, the decoding-key holding unit 43 does not hold a pair of a MAC address and a decoding key at all.

The decoder unit 44 uses the decoding key received from the decoding-key retrieving unit 42 to decode the simultaneously received data packet. If the decoding-key retrieving unit 42 receives no "decoding command", it ignores the decoding key and allows the received packet to pass through it. The mentioned decoding of encryption is basically based on a "secret-key encryption method". After decoding by the decoder unit 44, the packet decoded when the decoder unit 44 receives either the "decoding command" or the packet allowed to pass when the decoder unit 44 does not receive the "decoding command" is transferred to the decoded data diagnosis unit 45. The decoder unit 44 does not transfer the decoding key, deletes it, and awaits the input of the next packet.

The decoded data diagnosis unit 45 performs examination of whether the packet transferred from the decoder unit 44 "has been normally decoded". Only when having determined that "decoding has been normally performed", the decoded data diagnosis unit 45 transfers the next data to the data storage unit 46. When having determined that "decoding has not been normally performed", the decoded data diagnosis unit 45 deletes the packet.

The examination process by the decoded data diagnosis unit 45 is performed by whether a decoding diagnosis code added to the end of each packet represents a constant determined beforehand by the transmitting and receiving systems. In other words, because the transmitting system encrypts the decoding diagnosis code added as a constant to the end of each packet by using a key identical to that with which the payload part of the packet is encrypted, the decoding diagnosis code must be reproduced when the correct key is used in correct decoding. If the correct decoding has not been performed, the decoding diagnosis code has an unexpected value, which indicates that the entire packet has not been normally decoded.

A packet that has passed through the decoder unit 44 without being encrypted at the transmitting side must have a correct value, and cannot be deleted by the decoded data diagnosis unit 45.

The packet is deleted by the decoded data diagnosis unit 45 in the following cases: (1) the case in which a decoding key corresponding to a MAC address is incorrectly set; and (2) the case in which some processing error caused by the decoder unit 44 occurs. The case (1) can occur when the setting of a sequentially changing decoding key delays in the data receiving unit 20 since the encryption key corresponding to the MAC address sequentially changes at the transmitting side. Otherwise, the case (1) can occur due to failure in the setting of the decoding key by the controller 24.

Decoding must be examined in the data receiving unit 20 because of the following reasons: (1) a meaningless packet should not be transferred to prevent a load on the host computer 30 from increasing since the transfer of the meaningless packet as the result of failure in decoding causes the host computer 30 to delete the meaningless packet; and (2) a meaningless packet should not be transferred since the transfer of the meaningless packet as the result of failure in decoding may damage (or break in the worst case) the host computer 30.

The data storage unit 46 stores each "correctly decoded packet" or each "originally un-encrypted packet" which is transferred from the decoded data diagnosis unit 45. The data storage unit 46 functions to absorb a time delay generated by communication conditions of a data transfer protocol (e.g., TCP/IP) between the host computer 30, which is a final packet destination, and the received-data output I/F 23, which is connected to the host computer 30 by some method. Since the data storage unit 46 has a structure of transferring each data packet in response to a data packet request from the received-data output I/F 23, it must temporarily data.

Figure 5:
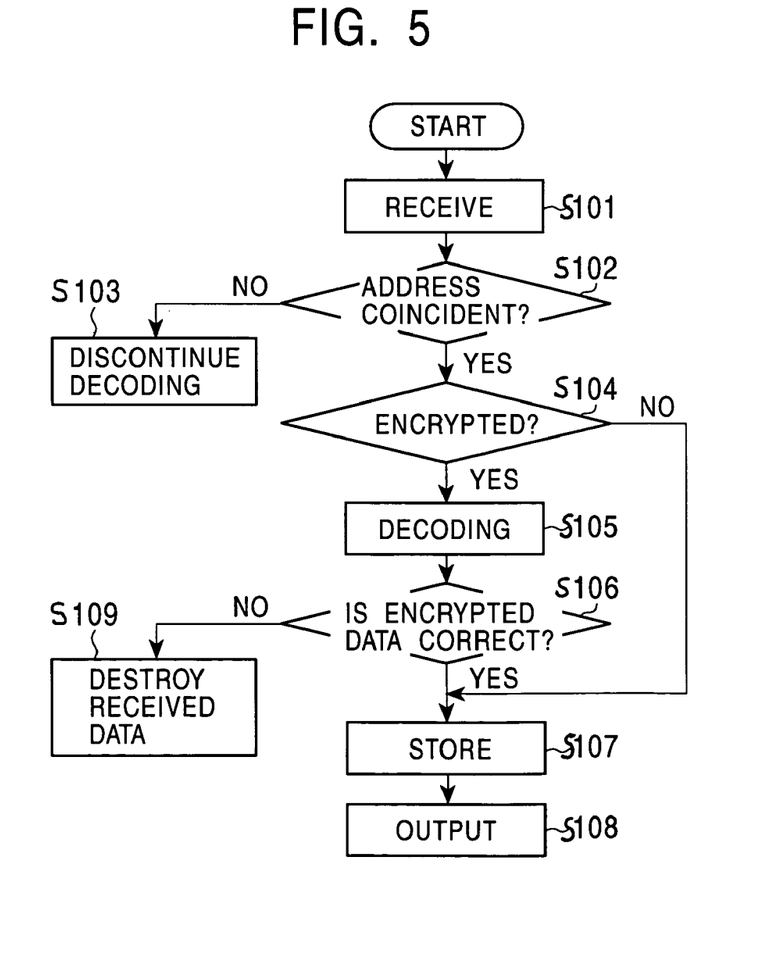
FIG. 5 is a flowchart illustrating an example of a process performed in the data decoder shown in FIG. 3.

The process performed by the data decoder 22 is shown by the flowchart shown in FIG. 5.

In step S101, the process receives signal data in a required band. In step S102, the process determines whether an address included in the received data is directed to the data receiving unit 20. If the address is not directed to the data receiving unit 20, the decoding of encrypted data is discontinued in step S103. Even if the address is not directed to the data receiving unit 20, data that can be received in common by each station is decoded.

When the process determines based on coincidence of the address that the data can be received, the process determines whether the received packet is encrypted in step S104. If the process determines affirmatively in step S104, decoding is performed using a decoding key which is considered correct in step S105. In step S106, the process determines whether the data of the decoded packet is normal. If the process has determined affirmatively in step S106, it transfers the data to the data storage unit 46 in step S107. In step S108, in response to a predetermined transfer request, the stored data is output. If the process has determined negatively in step S106, all the data of the packet are deleted in step S109. If the process has determined that the received data is not encrypted, the data is not decoded but is directly supplied to the data storage unit 46, and is output.

Although the data receiving unit according to the above-described embodiment is not of a built-in type but a box-type, its form may be variously modified such as the built-in type. In the above-described embodiment, the present invention is applied to a system that receives data via a communications satellite 3. However, it is obvious to apply the present invention to a system that receives data via another types of transmission channel.

What is claimed is:

1. A data receiving method, comprising the steps of:
    extracting required data from among received digital signal data to form extracted data, wherein the received digital signal data includes a program for execution by a computer;
    decoding the extracted required data using a predetermined decoding key to form decoded data;
    using a receiver terminal self-diagnosis function to determine whether the decoded data meets a predetermined standard including a matching of a decoding diagnostic code added to the required data during transmission and encrypted using the predetermined decoding key with a predetermined constant; and
    deleting the decoded data when it is determined that the decoded data does not meet the predetermined standard, wherein the decoded data that is not deleted is supplied to the computer.

2. The data receiving method according to claim 1, wherein the step of decoding includes decoding in real time for each packet of the extracted data.

3. The data receiving method according to claim 2, wherein the step of using includes determining whether decoding has been performed meeting the predetermined standard in real time for each packet of the extracted data.

4. The data receiving method according to claim 3, wherein in the step of deleting, data which has not been decoded to meet the predetermined standard in real time is deleted in real time.

5. The data receiving method according to claim 1, comprising the further step of determining that address data included in said received digital signal data is directed to a receiving side at which the data receiving method is used, before performing the step of decoding.

6. The data receiving method according to claim 1, wherein said predetermined decoding key is set by an external input.

7. The data receiving method according to claim 1, wherein when said predetermined decoding key does not exist upon decoding a packet of the extracted data, the packet is deleted.

8. The data receiving method according to claim 1, wherein a key identical to a key used at a transmitting side for transmitting the digital signal data is used as said predetermined decoding key.

9. The data receiving method according to claim 1, further comprising the step of outputting only data treated as having been decoded to meet the predetermined standard.

10. A data receiving unit, comprising:
    receiving means for receiving signals;
    converting means for converting signals received by said receiving means into digital signal data;
    data extracting means for extracting required data from among said digital signal data obtained by said converting means to form extracted data, wherein said digital signal data includes a program for execution by a computer;
    decoding-key-setting means for setting a decoding key required for decoding the extracted data;
    decoding means for decoding the extracted data by using the decoding key set by said decoding-key-setting means to form decoded data;
    a receiver terminal employing a self-diagnosis function for examining the decoded data decoded by said decoding means based on a predetermined standard including a matching of a decoding diagnostic code added to the required data during transmission and encrypted using the decoding key with a predetermined constant; and
    deletion means for deleting data determined by said receiver terminal as having not been decoded to meet the predetermined standard, wherein the decoded data that is not deleted is supplied to the computer.

11. The data receiving unit according to claim 10, wherein said decoding means decodes each packet of the extracted data in real time.

12. The data receiving unit according to claim 10, wherein said receiver terminal examines whether each packet of the extracted data has been decoded to meet the predetermined standard.

13. The data receiving unit according to claim 12, wherein said deletion means deletes, in real time, data which has not been decoded according to the predetermined standard in real time.

14. The data receiving unit according to claim 10, wherein when said decoding means determines that address data included in the converted data from said converting means is directed to said data receiving unit, said decoding means performs decoding.

15. The data receiving unit according to claim 10, wherein said decoding-key-setting means sets the decoding key based on an external input.

16. The data receiving unit according to claim 10, wherein when the decoding key for decoding a packet of the extracted data does not exist, said deletion means deletes the packet.

17. The data receiving unit according to claim 10, wherein a key identical to a key used at a transmitting side for transmitting said signals received at said receiving means is used as the decoding key set by said decoding-key-setting means.

18. The data receiving unit according to claim 10, further comprising output means for outputting only data treated by said receiver terminal as having been decoded to meet the predetermined standard.

* * * * *

UNITED STATES PATENT AND TRADEMARK OFFICE
CERTIFICATE OF CORRECTION

PATENT NO.         : 7,082,198 B1                                                    Page 1 of 1
APPLICATION NO. : 09/697110
DATED              : July 25, 2006
INVENTOR(S)        : Makoto Ishii

It is certified that error appears in the above-identified patent and that said Letters Patent is hereby corrected as shown below:

Column 3, line 5, "in" should read --$1n$--.

Column 3, line 24, "in" should read --$1n$--.

Signed and Sealed this

Third Day of April, 2007

JON W. DUDAS
*Director of the United States Patent and Trademark Office*